United States Patent
Draving et al.

(10) Patent No.: US 7,251,572 B1
(45) Date of Patent: Jul. 31, 2007

(54) FINDING RANDOM JITTER IN AN ARBITRARY NON-REPEATING DATA SIGNAL

(75) Inventors: Steven D Draving, Colorado Springs, CO (US); Allen Montijo, Colorado Springs, CO (US)

(73) Assignee: Agilent Technologies, Inc., Santa Clara, CA (US)

( * ) Notice: Subject to any disclaimer, the term of this patent is extended or adjusted under 35 U.S.C. 154(b) by 0 days.

(21) Appl. No.: 11/486,559

(22) Filed: Jul. 14, 2006

(51) Int. Cl.
G06F 19/00 (2006.01)
H04B 17/00 (2006.01)

(52) U.S. Cl. .................. 702/69; 702/191; 375/226; 375/227

(58) Field of Classification Search .......... 702/69, 702/71, 73, 74, 79, 76, 190, 191; 375/130, 375/226, 227
See application file for complete search history.

(56) References Cited

U.S. PATENT DOCUMENTS 5,222,028 A * 6/1993 LaBarre et al. ............ 702/73
2006/0045175 A1 * 3/2006 Draving et al. ........... 375/224

* cited by examiner

*Primary Examiner*—Bryan Bui

(57) ABSTRACT

Discovery of RJ assumes an Adjusted TIE Record for TJ from which DDJ has been removed. What remains is PJ+RJ, from whose Fourier Transform PJ is 'synthetically deconvolved' to leave just RJ: Calculate the Power Density Spectrum of PJ+RJ, and determine a threshold that indicates a PJ component. Identify in the PDS the largest frequency component that exceeds the threshold, otherwise there is no significant PJ and PJ+RJ can be taken as RJ. If a frequency component exceeds the threshold, take the largest and calculate what the convolution of it with the FT of the Transition Pattern would be if this circumstance were to occur in isolation, and then remove it from PJ+RJ. Repeat with continued iterations, until there are no further PJ components.

8 Claims, 5 Drawing Sheets

US 7,251,572 B1

FINDING RANDOM JITTER IN AN ARBITRARY NON-REPEATING DATA SIGNAL

REFERENCE TO RELATED PATENT DOCUMENTS

The subject matter of this Patent is related to that of U.S. patent application Ser. No. 10/929,194 entitled METHOD AND APPARATUS USE RE-SAMPLED TIE RECORDS TO CHARACTERIZE JITTER IN A DIGITAL SIGNAL filed 30 Aug. 2004 by Steven D. Draving and Allen Montijo and assigned to Agilent Technologies, Inc. For the sake of brevity and yet guard against unforeseen oversights, METHOD AND APPARATUS USE RE-SAMPLED TIE RECORDS TO CHARACTERIZE JITTER IN A DIGITAL SIGNAL is hereby incorporated herein by reference. The subject matter of this Patent Application is also related to that of U.S. patent application Ser. No. 10/978,103 entitled METHOD OF FINDING DATA DEPENDENT TIMING AND VOLTAGE JITTER IN AN ARBITRARY DIGITAL SIGNAL IN ACCORDANCE WITH SELECTED SURROUNDING BITS filed 29 Oct. 2004 by Steven D. Draving and Allen Montijo and assigned to Agilent Technologies, Inc. The subject matter of this patent Application is further related to that of U.S. patent application Ser. No. 11/479,414 entitled FINDING DATA DEPENDENT JITTER WITH A DDJ CALCULATOR CONFIGURED BY REGRESSION filed 29 Jun. 2006 by Steven D. Draving and Allen Montijo and assigned to Agilent Technologies, Inc. These latter two patent Applications describe methods of discovering values of Data Dependent Jitter that can plausibly be ascribed to the various bits in an arbitrary digital signal. For the same reasons as above, and because the subject matter of the instant patent presumes that any Data Dependent Jitter has already been found, METHOD OF FINDING DATA DEPENDENT TIMING AND VOLTAGE JITTER IN AN ARBITRARY DIGITAL SIGNAL IN ACCORDANCE WITH SELECTED SURROUNDING BITS and FINDING DATA DEPENDENT JITTER WITH A DDJ CALCULATOR CONFIGURED BY REGRESSION are each hereby incorporated herein by reference.

PLAN OF THE DESCRIPTION

This patent is similar in subject matter to that of the incorporated METHOD AND APPARATUS USE RE-SAMPLED TIE RECORDS TO CHARACTERIZE JITTER IN A DIGITAL SIGNAL. In that prior Application a particular technique is used to discover Total Jitter and isolate therein various other types of 'component' jitter while using a Test Pattern that could be applied as many successive repetitions. Those tasks involved a paradigm for characterizing Total Jitter through assumptions about the nature of different kinds of jitter, and various operations to perform the discovery and separation. We are interested in a comparable set of activities, save that we wish to relax the requirement that there be successive repetitions of a Test Pattern. Accordingly, much of the motivation for how to initially proceed is the same here as it was for METHOD AND APPARATUS USE RE-SAMPLED TIE RECORDS TO CHARACTERIZE JITTER IN A DIGITAL SIGNAL, although its ultimate concluding techniques depend upon repetition of the Test Pattern (so as to allow the effects Random Jitter on the measured values to undergo self-cancellation), and cannot be used in the absence of such repetitions. Given this similarity in the 'starting place,' we chose to rob the first dozen or so pages from METHOD AND APPARATUS USE RE-SAMPLED TIE RECORDS TO CHARACTERIZE JITTER IN A DIGITAL SIGNAL, and also its first three figures, and then repeat that material here in somewhat condensed and streamlined form, while also incorporating some necessary changes that steer toward a different technique that does lend itself to the absence of repetition of the Test Pattern.

The borrowed material essentially describes how the Total Jitter is discovered in the first place, and the paradigm for construing its components. Subsequent (new) material deals in detail with only aspects of the new technique for the relaxed Test Pattern requirement. As for our 'compact re-use' of METHOD AND APPARATUS USE RE-SAMPLED TIE RECORDS TO CHARACTERIZE JITTER IN A DIGITAL SIGNAL despite its also being incorporated by reference, we prefer that this Application be self-contained rather than include a whopper of a first step called "First understand how the repetitive technique works . . . ". That would be asking the reader to do more than is actually necessary. Furthermore, we would find ourselves making many references to material that was in another document intended to accomplish a different task, and with no easy way to eliminate some things not of interest here, or re-cast other things that are of interest into terms subsequently found to be more pleasing or satisfactory. The opportunities for confusion and aggravation would abound, all at the reader's expense. Phooey.

As it is, we are going to draw a 'cordon sanitaire' around the notion of Data Dependent Jitter and assume that it has been suitably defined, found and removed from Total Jitter to leave something that is Random Jitter combined with Periodic Jitter, and from which we desire to isolate and separate the component Random Jitter. It is in support of this encapsulation of the task of finding Data Dependent Jitter that METHOD OF FINDING DATA DEPENDENT TIMING AND VOLTAGE JITTER IN AN ARBITRARY DIGITAL SIGNAL IN ACCORDANCE WITH SELECTED SURROUNDING BITS and FINDING DATA DEPENDENT JITTER WITH A DDJ CALCULATOR CONFIGURED BY REGRESSION have been incorporated by reference. (We should note, however, that there are yet other ways of finding Data Dependent Jitter, some of which are described in the Background set out in the incorporated METHOD AND APPARATUS USE RE-SAMPLED TIE RECORDS TO CHARACTERIZE JITTER IN A DIGITAL SIGNAL.) This business of variously finding Data Dependent Jitter is rather complicated and fussy, but if we proceed carefully, we can avoid having to deal with it here in any real detail.

INTRODUCTION AND BACKGROUND

High speed digital systems rely on the ability to correctly ascertain the logical value of a binary data signal at specific times. In a digital system there are abrupt transitions between the logical values, and the nominal period of time that the data signal represents a particular logical value is called the UI (for Unit Interval). Generally there is provided (or derived) another signal, called a clock signal, whose period is also the UI and whose abrupt transitions in a selected direction serve as the 'specific times' (mentioned above) at which the logical value of the data signal is to be ascertained, a process often termed 'sampling.' It is common for the phase of the clock signal to be adjusted relative to the transitions in the data signal such that the sampling according to the clock signal will occur in the middle of the unit interval of the data signal. If satisfactory performance is to be achieved in a modern high speed system the error rate in sampling and ascertaining the logical values may need to be very low, often only one error in $10^{12}$ bits, or even less.

In an ideal world, all edges in a clock or data signal would occur at locations along a time axis that were an exact UI apart, or for data signals, perhaps variously at different exact multiples of the unit interval. The 'rattle' in the edges of a signal that is supposed to transition only at particular times (here, at the expiration of one or more consecutive unit intervals) is called jitter. In today's high performance digital systems, the presence of jitter in the data signal and in the clock has a significant effect on the system's ability to correctly ascertain the logical value of the data signal. There are other error causing mechanisms, to be sure, but if a high speed digital system is to offer good performance it needs to have low jitter (say, $\frac{1}{1000}$ UI RMS, or less).

To reduce jitter one generally has to locate its source, and it turns out that it is useful and productive to recognize several different types of jitter. It is now common for test equipment intended for use with high performance digital systems to include in their repertoire of operations automated measurements of jitter, and to do so while recognizing several different types of jitter, each of which can be separately characterized. Total Jitter (TJ) is the aggregate amount of observable jitter, and is (or ought to be) the 'sum' of all the various types of component jitter that can be recognized.

There are wide variations among techniques for jitter measurement. In particular, there are some 'brute force' techniques that perform all of N-many trials, and which can seem to take forever (hours, or even days!) to get accurate results having resolution in parts in $10^{12}$. Even if the UI is one nanosecond, it still takes over twenty minutes to measure $10^{12}$ of them. And some techniques require N-many repetitions of a suitable test pattern that is in the range of one hundred or a thousand UI in length. Clearly, such brute force approaches are not suitable for quickly characterizing expected low rates of jitter.

Various strategies have been developed to cope with this situation. These often revolve around assuming that some of the jitter is random in nature, with the rest arising from various other mechanisms. The idea is that, if the nature of a component source of jitter is known, then it can be represented by a suitable model. The significance of this is that, while the model needs coefficients to produce greater or lesser amounts of jitter, the shape of the probability distribution of that jitter component is specific to the model, so that the particular coefficients for a specific instance can be found by curve fitting techniques operating on a proper collection of samples. The plan (for, say, Random Jitter) is to sample for a reasonable amount of time, do a curve fit to instantiate the model, and then let the model predict with some confidence what we would get if we were to let the measurement run to conclusion using brute force techniques. Clearly, if that is the plan, then we need to have at hand for the curve fitting data that represents only that one kind of jitter; otherwise the model's prediction will be inaccurate.

Now a new set of difficulties arises. The measured data (TJ) will contain the effects of all the different types of jitter. These include Periodic Jitter (PJ), Random Jitter (RJ) and Data Dependent Jitter (DDJ) that is correlated with the content of the data itself. It is not possible to readily directly measure values that pertain to only a particular component type of jitter, since we can't observe those types in isolation: the measured data will generally include the combined effects of all types of jitter. Not only must indirect methods be developed to isolate or separate from the combined result the data for individual types of jitter (so that models or other analysis can be applied to appropriate data), but there is more than one way to decompose into components the combined jitter (TJ) that is actually measured.

We are particularly interested here in a jitter measurement technique for discovering RJ that is useable in a real time Digital Sampling Oscilloscope (DSO) or comparable environment (such as a Timing Analyzer) to produce credible and valid results in seconds instead of hours. While there are various techniques that are known for measuring TJ and separating it into its component types, each has a related set of prerequisites. For example, the technique described in METHOD AND APPARATUS USE RE-SAMPLED TIE RECORDS TO CHARACTERIZE JITTER IN A DIGITAL SIGNAL requires repetitions of an applied Test Pattern to allow self-cancellation of RJ, and thus allow its removal as a component from the aggregate data.

To provide a bit more detail concerning this point, the measurement technique described in METHOD AND APPARATUS USE RE-SAMPLED TIE RECORDS TO CHARACTERIZE JITTER IN A DIGITAL SIGNAL begins with the production of a digital test sequence that comprises many repetitions of a Test Pattern containing a wide variety of bit values in combination. An Acquisition Record is made of the entire test sequence. A complete Time Interval Error (TIE) Record is made of the Acquisition Record. The complete TIE Record is separated into a collection of Component TIE Records, one for each transition in the Test Pattern, and that contains all the different instances in the test sequence of that particular transition in the Test Pattern. (To be sure, not every clock cycle exhibits a transition in the original data, and that causes a phenomenon called 'holes' that violates an equal time between samples requirement common to easily implemented Fourier Transform techniques. Upon reflection, it will be appreciated that a Component TIE Record has no 'holes' because those holes, if we actually bothered to do it, would have each been collected into respectively associated Component TIE Records that would then nevertheless remain empty.) A Fourier Transform (FT) is performed on each (non-empty!) Component TIE Record, and the collected DC contributions of those FTs can be combined to produce an indication of Deterministic Jitter (Data Dependent Jitter 'plus' Periodic Jitter). The various frequency components in the spectral content of the FTs for the Component TIE Records are identified by application of a threshold to a power spectrum and then combined to produce an indication of Periodic Jitter. That Periodic Jitter can then (in this method) be removed from those FTs (without the DDJ-related DC components) to leave a resultant indication of Random Jitter. It is for the production of this spectral content that the applied Test Pattern needs to be repeated, so that holes in the input to those FTs appear to vanish. This approach avoids mischief that would otherwise be caused by attempting to perform a Fourier Transform upon an Original TIE Record containing holes (as it surely must do). Such an FT would produce a spectrum that is badly corrupted by the holes, and for which the separation of components according to some criteria (DC level, threshold comparison) is next to impossible.

There is a need for a Random Jitter measurement technique using a real time DSO or Timing Analyzer that operates quickly, preserves useful ancillary information, whose resolution scales with longer measurement times, and that tolerates a test sequence of arbitrary length and content that might either be random or be actual 'live' data measured while the system was in operational use. The RJ discovery technique described in METHOD AND APPARATUS USE RE-SAMPLED TIE RECORDS TO CHARACTERIZE JITTER IN A DIGITAL SIGNAL meets most of these needs, but requires that there be many (the more, the better, up to a point) repetitions of an applied Test Pattern. We need to accommodate situations where the Test Pattern, instead of being repetitive, is just one suitably long instance of arbitrary data (which might be some special data cooked up ahead of time, be pseudo-random, or, be genuine 'live' data in a system in actual use). Without repetition of the Test Pattern, the luxury of avoiding the effects of the holes upon a Fourier Transform is not immediately at hand. What to do?

SIMPLIFIED DESCRIPTION

Measurement, separation and analysis of RJ in a System Under Test begins with the production of a suitably long digital arbitrary Test Pattern which may contain a random sequence of bit values, some other sequence of bits, or, which might be actual live data over which there is no external control. An Acquisition Record describing the sequence of logical values along a time axis is made of the entire arbitrary Test Pattern. A complete Time Interval Error (TIE) Record is made from an inspection of the locations of the edges in the Acquisition Record.

Assuming that we have an Adjusted TIE Record for which DDJ has been defined, isolated and removed from an Original (think: TJ) TIE Record, what remains in the Adjusted TIE Record is the effect of Periodic Jitter combined with Random Jitter (denoted by PJ+RJ). It is this remnant combination that we wish to separate into individually identified amounts for PJ and RJ to find RJ.

We would like to perform this RJ–PJ separation in the frequency domain using a threshold-based technique similar to that used in the incorporated METHOD AND APPARATUS USE RE-SAMPLED TIE RECORDS TO CHARACTERIZE JITTER IN A DIGITAL SIGNAL. However, the presence of holes in the Adjusted TIE Record corrupts the spectrum too much to use a simple threshold technique. The solution to this problem lies in an appreciation of the following relationship: the FT of the Adjusted TIE Record (with holes) is equivalent to the FT of the Adjusted TIE Record without holes convolved with the FT of the TP (Transition Pattern). That is, TP is a 'derivative' waveform record that is equal to ONE where transitions are present in the Test Pattern and equal to ZERO where transitions are absent. We do indeed appreciate that relationship because the Adjusted TIE Record (with holes) would be equivalent to an Adjusted TIE Record without holes (if such there were) as 'multiplied' by the TP.

Since we can't simply de-convolve the FT of the TP-combined-with-jitter by applying our earlier PJ-related threshold to remove PJ, we shall perform a 'synthetic' de-convolution by the application of a more sophisticated PJ-related threshold, as implemented by the following iterative technique. First, ensure that the logical sequence of ONEs and ZEROs in the measured Test Pattern is at hand; we will need it, so re-construct it from the sampled data, if it is not already known. Now calculate the PDS (Power Density Spectrum) of the PJ+RJ, and determine a threshold applicable thereto that indicates the presence of a frequency component that is likely to be associated with PJ. Identify in the PDS the frequency component with the largest amplitude that also exceeds the threshold, if there is one. If there is not such a frequency component, then there is no significant PJ and all of what was thought to be PJ+RJ can be taken as RJ, and we are finished separating RJ.

If, on the other hand, there is an identified frequency component that exceeds the threshold, take the one with the largest amplitude, calculate the convolution of that frequency component with the FT of the Transition Pattern (TP) in the data of the Test Pattern. Even though there may well be more contributors to PJ, this identifies the jitter for this particular contributor, as if it did occur in isolation. Surely this amount is 'part of' the PJ+RJ for which we have a description. Let us make a note of this partial amount, and then remove it from the FT of the PJ+RJ to produce a diminished PJ+RJ (which is an improved approximation for RJ). Now take the diminished PJ+RJ as the next PJ+RJ and calculate its PDS as before, and recalculate a next threshold, and find (if there is one) a next largest frequency component. As before, we then convolve the FT of that next largest frequency component with the FT of the TP to find another 'part of' PJ+RJ that is noted and then removed, and so forth with continued iterations, until there are no further PJ components identifiable in the newest PDS. At this point we are justified in believing that we have 'sucked out' all significant PJ from PJ+RJ, and have a remnant RJ PDS with an associated list of component PJs. The remnant PDS (or the original PDS, if no threshold criteria was met) can be summed and root squared to produce an RMS value for RJ. Voila.

DETAILED DESCRIPTION

Figure 1:
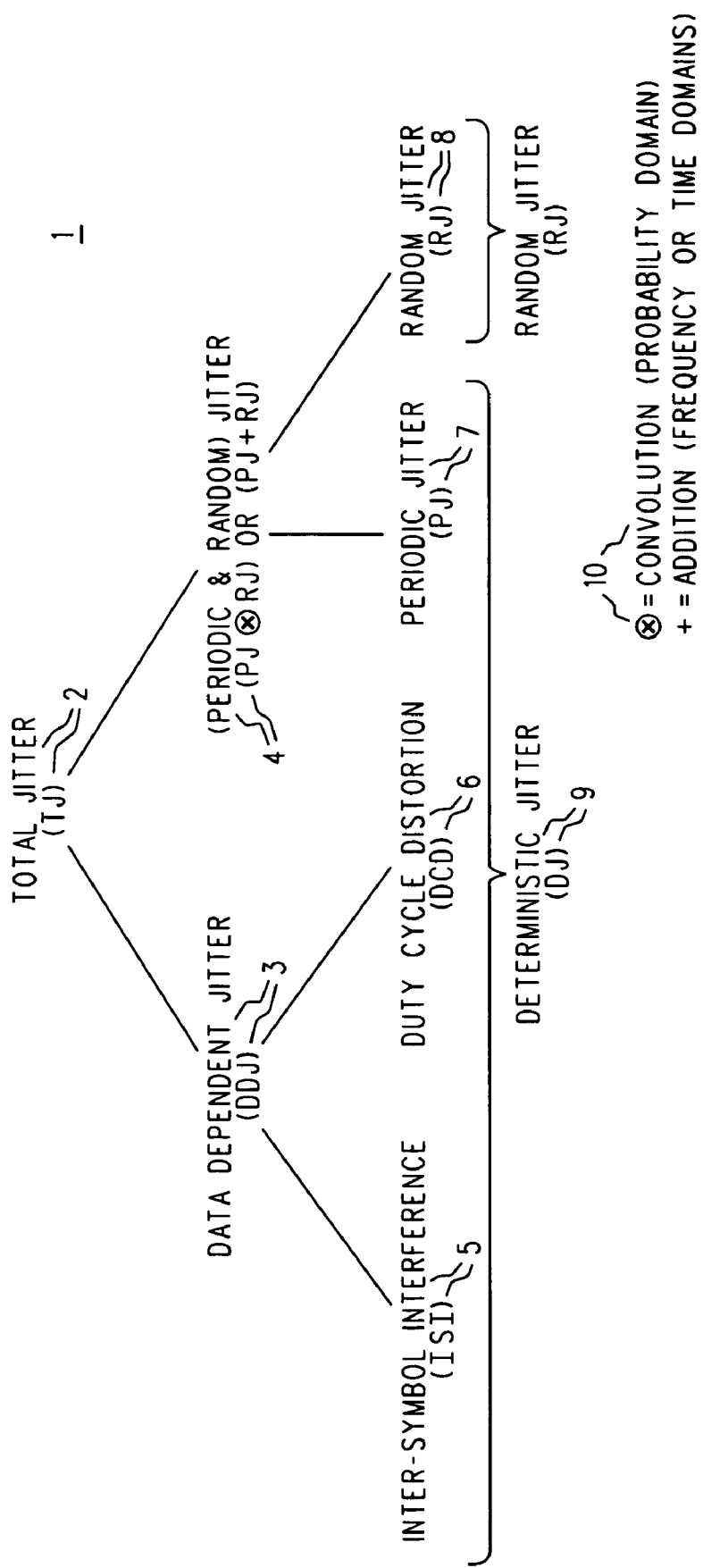
FIG. 1 is a prior art diagram illustrating a preferred manner of decomposing Total Jitter into Deterministic Jitter and Random Jitter.

Refer now to FIG. 1, wherein are shown some relationships between the various types of (timing)jitter with which we shall be concerned. FIG. 1 is a diagram 1 describing a paradigm we shall use in understanding jitter. It begins at the top with the notion that there is something called TJ (Total Jitter) 2. It represents all the aggregate jitter that is present in the system being measured. It is the thing that, while in principle can be measured by direct observation, takes too long to discover by such a brute force method.

In the paradigm of FIG. 1, TJ 2 is composed exactly of two component parts, one of which we call DDJ 3 (Data Dependent Jitter) and the other of which is the combination (4) of PJ & RJ. Note that both of these representations for jitter are probability density functions. This leads us to the observation, which will be familiar to those who operate with probabilities, that the proper method of combining, or summing, two probability density functions such as 7 and 8 is convolution, which operation is indicated by the symbol ⊗(10). To describe the same combination expressed in the time domain or in the frequency domain, a more appropriate notation is PJ+RJ. We shall have occasion to use both notations, depending upon the circumstances.

RJ 8 is assumed to arise for inescapable natural reasons, after the fashion of thermal noise or quantum effects, and is further assumed to be Gaussian in nature. PJ 7 is jitter that has a strong periodic content, say, for example, that a strong periodic signal from another system is coupled via cross talk into the system being measured. It might have no correlation whatsoever to the SUT (System Under Test), but is nevertheless regular. And while the presence of PJ is allowed, we don't demand that it actually be there. That is, in some SUTs there might not be any detectable PJ.

The other component of TJ 2 is DDJ 3. This is jitter that is caused by, or is correlated with, the particular patterns of bits in the data being transmitted. It turns out that there are mechanisms that allow what has already been sent, or that will be sent, to affect the reception of the bit currently being received. ('Already been sent' seems benign enough; perhaps local heating or cooling related to certain activity in the data disturbs thresholds or alters rise or fall times. But 'will be sent' might seem as if it requires an effect to precede its cause. Not to worry. The idea is that a complex transmitting mechanism, such as a SERDES, say, has a highly pipelined parallel architecture with busses interconnecting FIFOs and registers all susceptible to cross talk, and that the complex transmitting mechanism DOES ALREADY CONTAIN the evil data that is the 'cause.' That data just hasn't been sent yet over the transmission path to the receiver, and the jitter will get into the data as it is sent. Thus, causation still precedes its effect, and no mysterious metaphysics is required.) Since these phenomena are already reported in the literature, we needn't dwell on them further. One measure of such DDJ is ISI 5 (Inter-Symbol Interference) and another is DCD 6 (Duty Cycle Distortion). Those seeking further information about these measures of jitter are referred to some product literature cited in the incorporated METHOD AND APPARATUS USE RE-SAMPLED TIE RECORDS TO CHARACTERIZE JITTER IN A DIGITAL SIGNAL.

Finally, we group ISI, DCD and PJ together as DJ 9 (Deterministic Jitter). It will be appreciated that while the DDJ portion of DJ is separable into ISI and DCD, those components are not necessarily independent nor mutually exclusive, and they generally do not combine by convolution. In any event, the intent of this grouping is that DJ 9 is all jitter that is not truly random in nature (RJ, 8), but that is either somehow correlated with the data, or is downright periodic, which in neither case fits our intuitive notion of 'random.' An important difference between RJ and DJ is that RJ has (in principle) a PDF (Probability Density Function) with an infinite domain, while DJ has a PDF whose domain is bounded.

Figure 2:
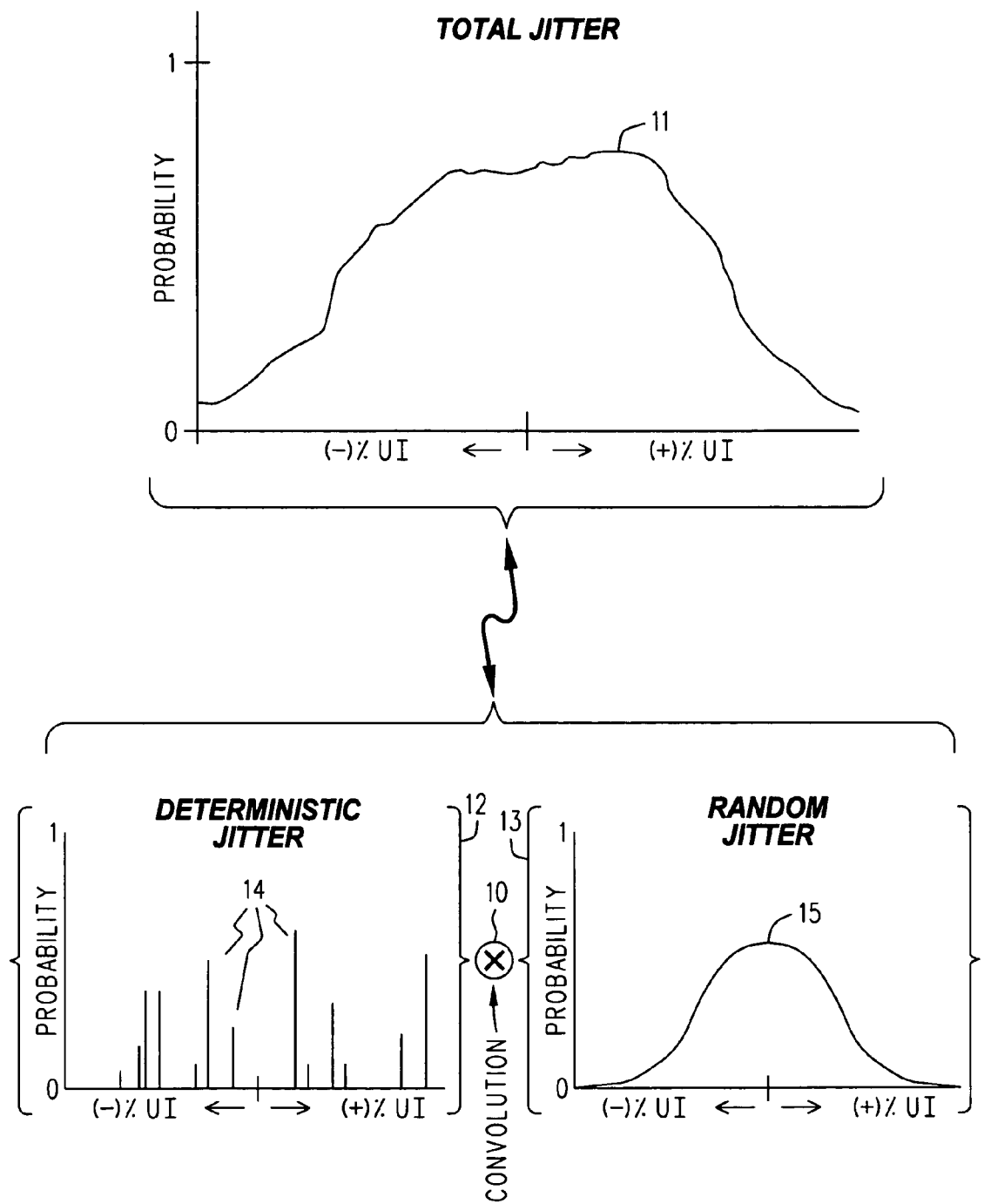
FIG. 2 is a prior art diagram illustrating that a histogram representing Total Jitter can be decomposed into separate probability distributions representing Deterministic Jitter and Random Jitter.

Refer now to FIG. 2, wherein is shown a histogram 11 representative of Total Jitter. Total Jitter is the actual aggregate amount of jitter the system exhibits, from whatever source. It is what is directly measurable, although it generally takes way too long to do so directly for the small amounts of jitter that are at present considered reasonable. Histogram 11 is not one that has been directly obtained by brute force measurements, although suppose for a moment that it is. Such a histogram is indeed an item that we would like to have (even if we don't actually have it), and we are showing it (11) in the abstract and in the spirit of saying "Well, there exists some histogram that describes the Total Jitter, and let's suppose that this (11) is it." It is a histogram of probability versus percent error in UI. That is, the amounts of jitter, while they could be described as absolute times, are instead described as position errors that are early or late arrivals in terms of the UI. The probability axis represents the likelihood that an edge occurred with that amount of position error. Now, in this regard, it may be tempting to think that the only possible errors are fractions of a UI. For some systems this would be a reasonable assumption. But we are operating at very high speeds for data streams of significant length. A slight drift in the data rate can accumulate errors to produce a transition location having more than a UI of error, when compared to the ideal correct time of signal transition.

To continue, then, our plan is to assert that there exists some histogram 11 describing Total Jitter, and argue that, whatever it is, that Total Jitter can be decomposed into Random Jitter and Deterministic Jitter. That is, we will assume that such a decomposition is a true partition of the Total Jitter: i.e., any type of jitter is either in one category or the other, and that none is in both. This leads us to assert that there is some representation 12 for Deterministic Jitter 9 that can be combined with a representation 13 for Random Jitter 8 that "adds up to" the histogram 11 for the Total Jitter. We note that we expect the Deterministic Jitter to usually be discrete and static, as indicated by the collection of spectra-like lines 14 (note we are not accusing them of being spectral components in the signal . . . just that their shapes resemble a displayed spectra). We also expect the Random Jitter to follow some plausible distribution found in nature, such as a Gaussian one represented by distribution 15.

Figure 3:
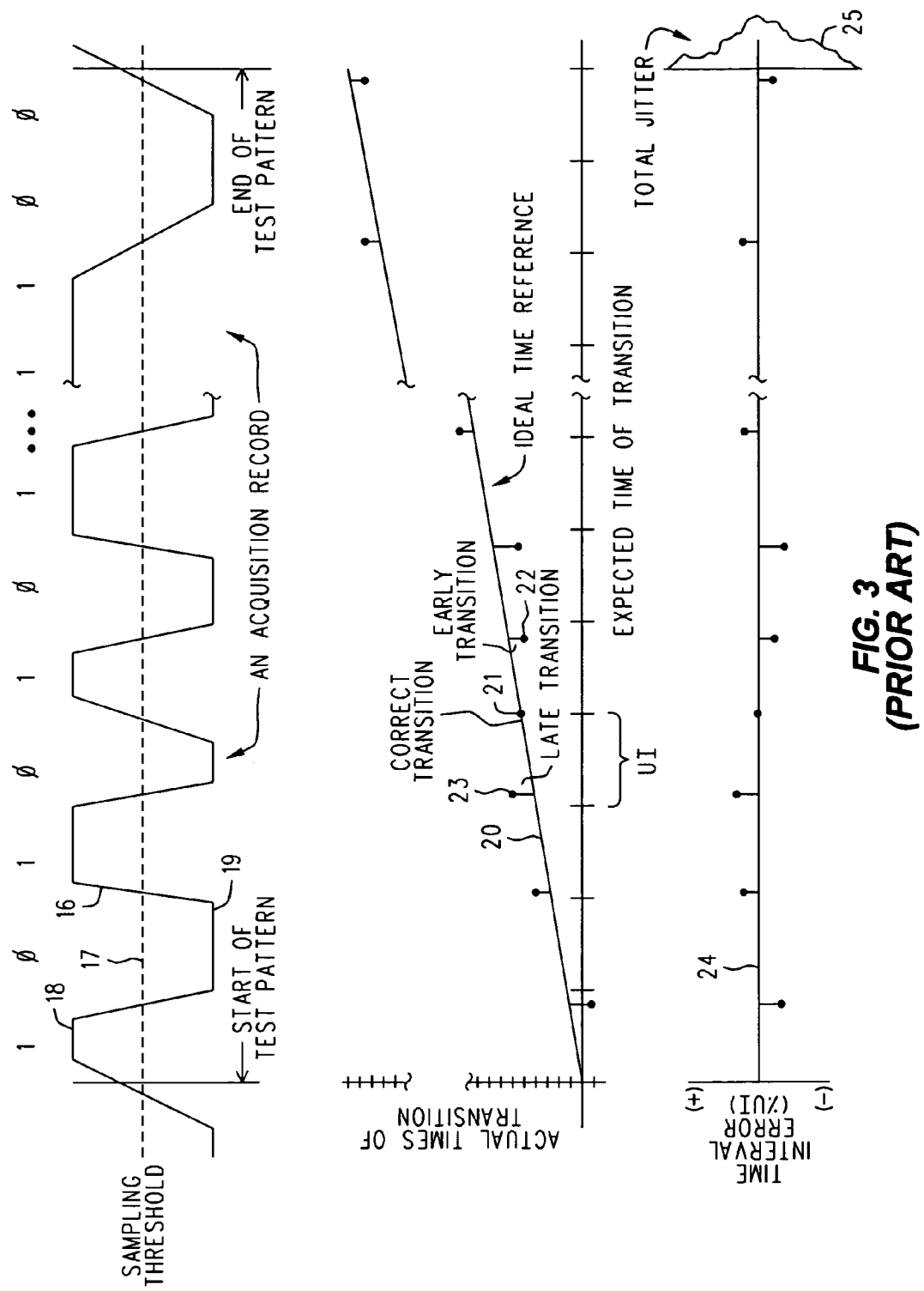
FIG. 3 is a prior art diagram illustrating the notion of a TIE Record for a Data Acquisition Record and a prior art histogram produced therefrom to estimate Total Jitter.

In FIG. 3 an acquired data waveform 16 is depicted, along with a threshold 17 against which the data waveform 16 is compared for determining the logical values of TRUE and FALSE in a test pattern. In this example, the portion 18 of data signal 1 conveys a logical value of TRUE (a logic ONE), while portion 19 conveys a logical value of FALSE (a logic ZERO). We are not in this figure indicating how the time variant waveform of the data signal 16 is measured. That can be done in different ways, depending upon the nature of the test equipment. As an example that we are interested in, a real time DSO would digitize discrete sampled locations of the waveform at known times therealong. (It will be appreciated that for high speed signals there may be only ten or less samples per cycle, but that this does not present a problem, since the 'scope relies on a DSP (Digital Signal Processing) implemented reconstruction filter protected by the Nyquist limit to 'fill in the dots.') In any event, the test equipment would ultimately have in its acquisition memory a data structure called an Acquisition Record that represents the waveform of the data signal. We also are not in this figure indicating how the logical pattern in use is discovered from the reconstructed waveform according to the relationship between the waveform of the data signal 16 and the threshold 17. The pattern might, by simple agreement, be known ahead of time. To enforce that might, however, be quite inconvenient. Post processing by the DSO of the Acquisition Record 1 can reveal the sequence of logical values it contains, should that be desirable (which for us it will be). Another possibility is coupling the input signal to an actual hardware comparator having an actual threshold that produces an actual collection of logical ONEs and ZEROs from time stamped transitions (which would be how a Timing Analyzer acquires data, and in which case there probably would not be any separate samples that need DSP).

To continue in the DSO case, the samples representing the Acquisition Record 16 can be processed with DSP techniques and/or interpolation to discover with suitable precision the locations along a time axis when an edge in the data signal crossed the threshold 17. With a correctly set threshold (very probably one set in the middle of the signal's voltage excursion), jitter, if it is present, will cause the time locations of the threshold crossings to vary from the ideal sequence of consecutive UIs. This is shown in the middle portion of the figure, wherein is depicted an ideal time reference line 20, appended to which are indications of correct (21), early (22) and late (23) transitions. The length of these appendages is indicative of the degree of error. It is clear that if a Timing Analyzer provided time stamped transition data (as opposed to a DSO's digitized samples), the same correct/early/late actual time of transition information can be produced.

The process of discovering the Time Interval Error for an edge involves knowledge of what the UI ought to be, and that information might arise from how a clock signal that is supplied by the SUT, or that is recovered from its data, exhibits a transition in a particular direction. It might involve the phase locking of a time base in the DSO or Timing Analyzer to one in the SUT, since even precision laboratory grade time bases that are independent can be expected to drift relative to one another by amounts that correspond to significant amounts of jitter in a high speed system.

As an aside, we wish to point out that, although FIG. 3 is drawn as though each ideal UI is expected to be the same length of time, this need not be the case. There are systems where the UI varies on purpose. If we were to measure jitter in such a system we would presumably be informed about the nature of such variations, and could still correctly determine the errors that occur. We might then normalize these errors to be expressed as a percentage of expected UI, so that the members of a collection of such transition data are commensurable.

The bottom portion of FIG. 3 is a representation of a TIE (Time Interval Error) Record 24 that is prepared from the information depicted in the parts of the figure already described. The TIE Record is a description of the observed jitter, and corresponds to Total Jitter. Upon reflection, it will be appreciated that such a TIE record 24 is, in terms of information content, superior to a histogram, such as 11 in FIG. 2, in that actual instances of jitter are still embedded in their surrounding circumstances. (This is not to impugn the utility of the histogram 11; it readily conveys useful information by its shape that remains concealed within a TIE record such as 24.) One prior art technique constructs a histogram from the TIE data, and then uses that histogram as the basis for a model from which to make estimates of other types of jitter.

Henceforth, when we refer to a TIE Record, we shall have in mind a data structure implemented in the memory of suitable test equipment, such as a real time DSO or Timing Analyzer, which contains time interval error information of the sort depicted in the lower third of FIG. 3 (although without the histogram at the right-hand end), and that has been derived from circumstances similar to those set out in the top two portions of that figure.

Figure 4:
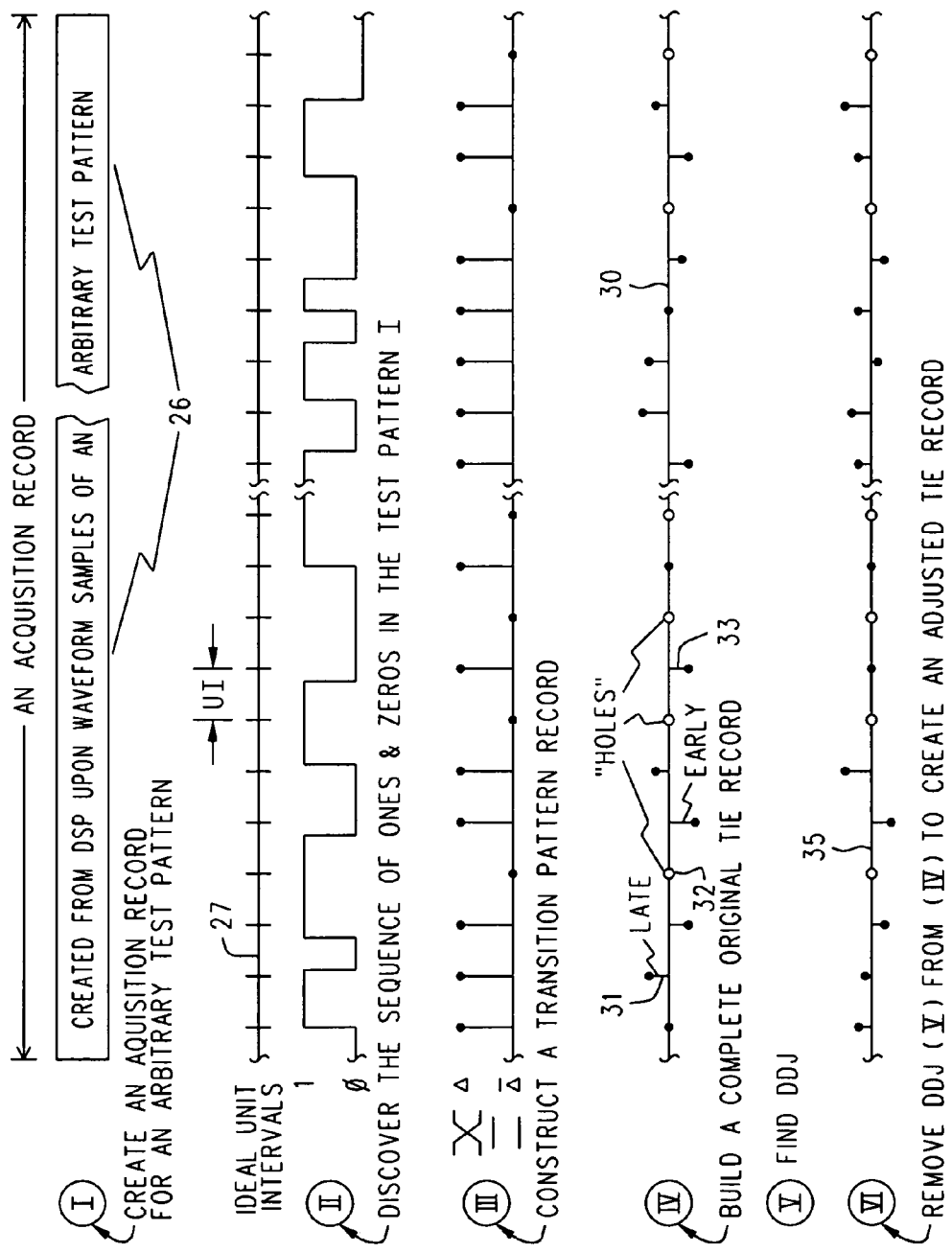
FIG. 4 is a diagram illustrating certain preliminary steps associated with performing a method that finds Random Jitter in an arbitrary non-repeating data signal.

Now refer to FIG. 4, which comprises a diagram illustrating a series of initial or preliminary steps that may be performed in preparation for separating RJ from PJ in an arbitrary non-repeating data signal. In Step I an arbitrary Test Pattern is represented in a (conventional) Acquisition Record 26 as either consecutive samples meeting the Nyquist requirements or as consecutive directed transitions. This Acquisition Record 26 is created by a suitable measurement process (probably assisted by DSP, and is almost certainly a tabular representation of time-of-transitions), and is the basis for the jitter measurements to follow. The Test Pattern is, in principle, arbitrary, in that it may be random data, live data or some other favorite sequence of bits prized for some special property. What is really required is that the Test Pattern be 'long' in comparison to patterns that produce DDJ and that it include a reasonable and fair number of the various bit sequences in the data that the SUT is expected to cope with. Pseudo random data is usually ideal for this purpose, although it is believed that live data generally works about as well provided that a long enough Acquisition Record is obtained. It won't generally be harmful if the data includes lopsided distributions of particular bit patterns, so long as others that are of interest are present in sufficient respective instances to provide the necessary degree of 'contribution.'

For convenience, a time scale 27 of ideal unit intervals is included in proper alignment with the sections below it. This is useful, as there are edges shown as part of Step II that, owing to jitter, do not transition at the edges of a UI.

In Step II the bit pattern 28 for the arbitrary Test Pattern is discovered, if it is not already known. For example, the discovery may be made in a real time DSO environment, where the Acquisition Record is consecutive digitized samples, by applying DSP to those samples to obtain a rendered result that is suitably dense and then comparing that against a threshold that is, say, midway between average maximum and average minimum values. We have shown the information found in Step II as a waveform corresponding to the meaning of the Acquisition Record 26 of Step I, as this visual device comports well with the TIE Record 30 of Step IV; in an actual system the information of Step II might be just a table indexed by consecutive ordinals corresponding to the consecutive UIs.

Step III is the construction of a Transition Pattern (TP) Record 29, which we show in the same general format as for TIE Records (it was convenient) but which in an actual system might also be just a table indexed by consecutive ordinals corresponding to the consecutive UIs.

In Step IV a complete Original TIE Record 30 is created from an inspection of the bit pattern produced in Step II. As described in connection with the bottom portion of FIG. 3, each edge in the Test Pattern gets a signed value that is the error in (the expected) time of occurrence for that edge. Ascending lines and dots (e.g., 31) indicate late transitions, descending lines and dots (e.g., 33) represent early transitions, while in each case the length of the lines represents the amount of the error. A dot by itself (e.g., 34) indicates a zero length line, and no error for the corresponding edge. Holes caused by an absence of a transition in the Test Pattern are indicated by empty circles (32). Of course, the TIE Record is numerical data stored in a memory-based data structure, and is not actually stored as an image as is seen in the figure. (It will naturally be appreciated that the image in the figure is merely a convenient way to indicate the kind of information that is in the data structure.)

Step V is the discovery of DDJ. We have no truly graceful way to indicate the result (with DDJ cause and effect can be widely separated, and an effect can seem to 'precede' its cause . . . ), although we could make it look like a TIE Record. In any event, Step V probably produces another table.

Step VI is the creation of an Adjusted TIE Record 35 that is the Original TIE Record 30 of Step IV after having the DDJ of Step V removed. And although we have shown it in graphical form, Adjusted TIE Record 35 (and the Original TIE Record 30) are almost certainly implemented as tables or other data structures in memory. No great complexity needs to permeate this Step VI, and it can be as simple as signed addition between corresponding elements of the Original TIE Record and the sequential elements of the record for DDJ. On the other hand, we do acknowledge that there operating environments where the amounts of jitter can exceed a UI, and that may entail some appropriate sophistication in understanding exactly what the correspondence is between 'corresponding' elements. Enough said.

Figure 5:
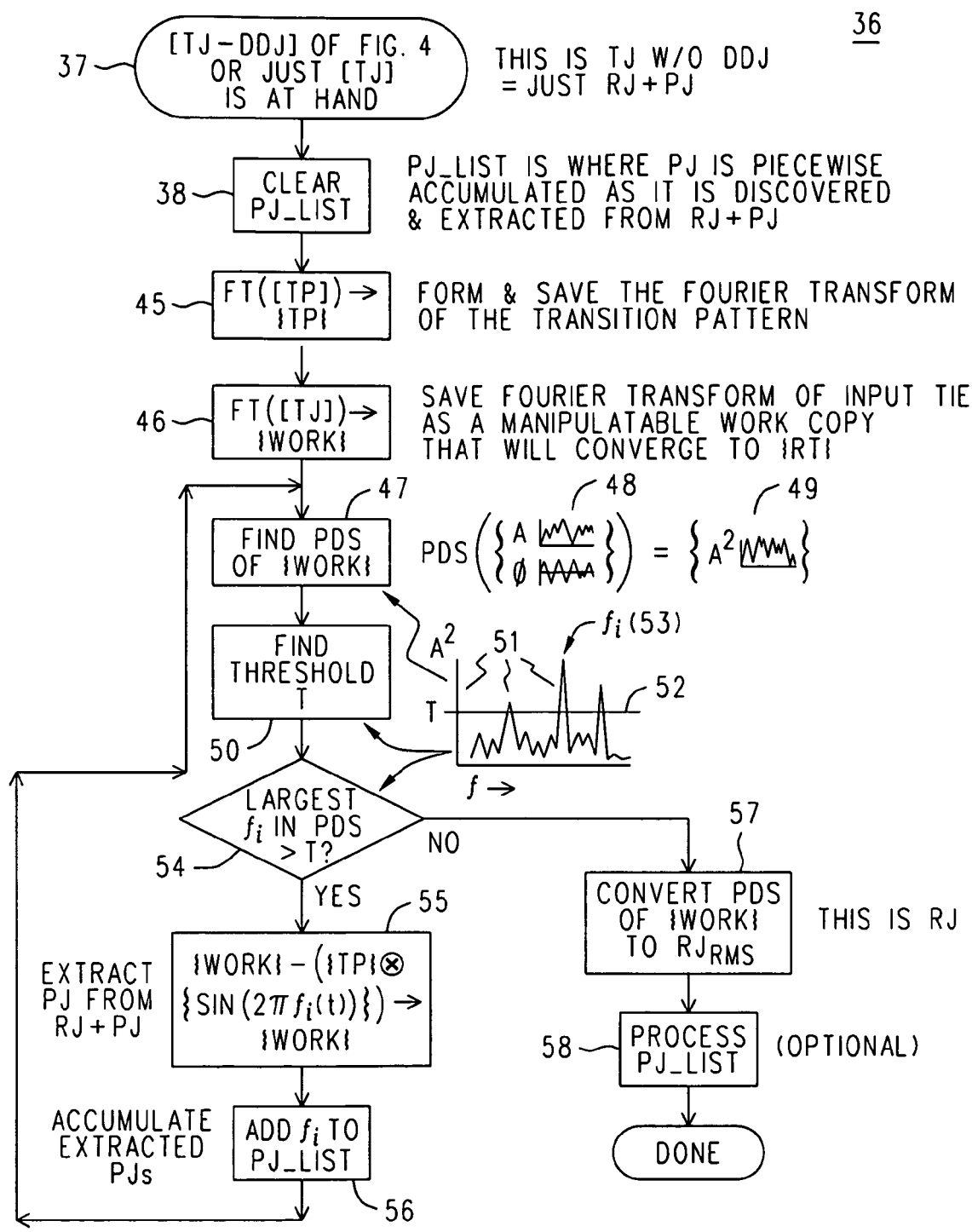
FIG. 5 is an illustrated flowchart of certain remaining steps, subsequent to those of FIG. 4, for performing a method that finds Random Jitter in an arbitrary non-repeating data signal.

Now consider FIG. 5, which is an annotated simplified flowchart 36 describing how the result of Step IV of FIG. 4 may be processed to isolate RJ from RJ+PJ. At the start 37 of the flowchart 36 the initial conditions might be that the activity of FIG. 4 has been accomplished, and that as an input quantity the Adjusted Tie Record (35 of FIG. 4) is at hand. The notation we used to indicate this quantity is [NAME] (in this case, [TJ–DDJ]), as explained in legends 39, 40 and 41 at the bottom of the figure. On the other hand, it might be the case that the environment that produced the measurements of RJ+PJ have no significant DDJ, that TJ is essentially RJ+PJ, and that Step IV of FIG. 4 is inappropriate or unnecessary. In such a case it will be understood that the subtraction indicated in [TJ–DDJ] is either harmless (i.e., is equivalent to [TJ–0]) or is simply omitted in favor of using [TJ] in place of the indicated difference. In other words, we do not require that there be a removal of DDJ from TJ before the activity of the flowchart 36 is begun to separate RJ and PJ. We do suggest, however, that persons skilled in the jitter arts will appreciate that if there is significant DDJ present in TJ, then it is wise to remove it, as its presence, if continued, will generally corrupt the Fourier Transforms of FIG. 5, and cast some degree of doubt upon the validity of the results.

In step 38 a thing called PJ_LIST is cleared. PJ_LIST can be a simple data structure that is used to record the frequency components that are discovered as contributing to PJ.

In step 45 the Fourier Transform (FT) of the Transition Pattern (TP) is formed; the notation is FT([TP])→{TP}, and is consistent with the legends 42, 43 and 44 at the bottom of the figure. What this does is create ahead of time an FT (namely, {TP}) that will be used as a constant in an iterative loop of steps 47, 50, 54, 55 and 56.

Next, at step 46 we find a work copy of a Fourier Transform {WORK} that starts out as FT([TJ]). This quantity will be manipulated by removing iteratively discovered PJ-related frequency components, so that {WORK} will converge toward {RJ}.

At step 47 we enter the top of the iterative loop proper. At this step we find the Power Density Spectrum (PDS) of {WORK}. As shown in the accompanying legend, this is accomplished by squaring the amplitude component and discarding the phase component.

At step 50 a threshold T (52) is found from an analysis of the PDS (51) found in step 47. We can think of the PDS as containing 'grass' and 'trees'. The 'grass' is just noise that can ignored, while the 'trees' represent periodic signals that are almost certainly related to PJ. One way to find the threshold T is to simply average all the values in the record, and set T as some related value, say, 110% of that average. The expected situation is shown in the diagram 51 to the right of step 50. We expect that oft times there will be peaks in the PDS ('trees') that extend above the threshold T (52). One such peak (53) represents the frequency components $f_i$.

Now, in step 54 the question is asked: does the largest $f_i$ in the PDS of steps 47 and 50 exceed the threshold T? There are a number of alternate and generally equivalent ways this basic question might be framed, including the trivial variations of including equality in the comparison. In any event, if the answer is NO, then there are two cases. The first is that there have been no iterations (YES answers) and that evidently there is no significant PJ, which is to say that all of RJ+PJ is just RJ. But that is what is represented by {WORK} at this point (it never got changed!), so at step 57 we convert that to an RMS value for RJ (namely, $RJ_{RMS}$). On the other hand, if there have been iterations (previous YES answers at qualifier 54), {WORK} will have previously been diminished by the various PJ components that have be identified, and step 57 is still correct.

To conclude the NO branch from qualifier 54, the step 58 after step 57 is the optional processing of PJ_LIST to create a value for discovered PJ. This may be accomplished in a manner that is already known in the art. Once that is accomplished (or not) an instance of activity for flowchart 36 has been concluded.

We, however, have not yet concluded our description of flowchart 36, as the YES branch from qualifier 54 remains still to be described. That YES branch leads to step 55, where the PJ-related frequency component ($f_i$–53) is removed from RJ+PJ, and the diminished result saved back in {WORK}. This is the essence of the 'synthetic deconvolution' mentioned earlier.

Here is some additional detail concerning step 55. Subsequent to a Fourier transformation, let us denote as $A_i$ and $P_i$ the respective amplitude and phase of the complex value of the frequency component, $f_i$. The symbol ⊗, as before, represents convolution. Keep in mind that an individual PJ frequency component (sine wave in the time domain), $f_i$, would not be manifest in {WORK} as a single complex value at location $f_i$. It would instead appear as the FT of the PJ sine wave convolved with the FT of TP. This will be so because the presence of holes in the Adjusted TIE Record act like amplitude modulation of the PJ by the Transition Pattern (TP). So when we say we remove the frequency component $f_i$ from {WORK}, we mean to remove $\{A_i \cos (2\pi t f_i + P_i)\} \otimes \{TP\}$ from {WORK}. This will, of course, be a complex subtraction, since each of the transforms $\{A_i \cos (\ldots)\} \otimes ®\{TP\}$ and {WORK} has both a phase and an amplitude.

The final step 56 in the iterative loop is to incorporate f into PJ_LIST. Following that the iterative loop is closed by a return to step 47, where a new PDS for the diminished {WORK} is found, followed by the finding of a new threshold T, etc.

We claim:

1. A method of measuring random timing jitter for a digital signal in a system under test, comprising the steps of:
  (a) processing consecutively sampled values of an instance of a bit pattern in the digital signal to produce an acquisition record;
  (b) measuring times of occurrence of consecutive edges in the acquisition record to form a corresponding time interval error record;
  (c) inspecting the acquisition record to form a transition pattern record indicative of instances in the bit pattern in the digital signal where the logical value changes;
  (d) forming the Fourier transform of the transition pattern record of step (c);
  (e) forming a work Fourier transform equal to the Fourier transform of the time interval error record of step (b);
  (f) forming a power density spectrum of the work Fourier transform;
  (g) subsequent to step (f), selecting a threshold that separates noise components within the power density spectrum of step (f) from peaks therein that are likely components of periodic timing jitter;

(h) determining if a largest peak within the power density spectrum of step (f) exceeds the threshold selected in step (g);

(i) only if the determination in step (h) is in the negative, then converting the work Fourier transform into a value to be understood as random timing jitter, else;

(j) only if the determination in step (h) is in the affirmative, then diminishing the work Fourier transform by the convolution of the Fourier transform of the transition pattern with the Fourier transform of the sine of a frequency corresponding to the largest peak determined in step (h); and then (k) repeating steps (f), (g), (h) and (j) until step (i) has been performed.

2. A method as in claim 1 further comprising, subsequent to step (b) and prior to step (e), the steps of determining data dependent jitter and of removing the effects of that data dependent jitter from the time interval error record of step (b).

3. A method as in claim 1 wherein step (j) further comprises retaining a record of frequencies corresponding to the largest peaks and step (i) further comprises converting that record of frequencies into a value to be understood as periodic timing jitter.

4. A method as in claim 3 further comprising, prior to step (f) the step of setting the record of frequencies to empty.

5. A method as in claim 1 wherein step (i) of converting the work Fourier transform further comprises finding the power density spectrum of the work Fourier transform.

6. A method as in claim 1 wherein step (h) also produces a determination in the affirmative if the largest peak is equal to the largest peak selected in step (g).

7. A method as in claim 1 wherein at least one of the Fourier transforms of steps (d), (e) and (j) is a Fast Fourier Transform.

8. A method as in claim 1 wherein the instance of a bit pattern in step (a) is a single instance of a non-repeating bit pattern.

* * * * *